United States Patent
Emo et al.

(10) Patent No.: US 7,841,164 B2
(45) Date of Patent: Nov. 30, 2010

(54) DIRECT METERING FUEL SYSTEM WITH AN INTEGRAL REDUNDANT MOTOR PUMP

(75) Inventors: Stephen M. Emo, South Bend, IN (US); Larry A. Portolese, Granger, IN (US)

(73) Assignee: Honeywell International Inc., Morristown, NJ (US)

( * ) Notice: Subject to any disclaimer, the term of this patent is extended or adjusted under 35 U.S.C. 154(b) by 693 days.

(21) Appl. No.: 11/857,902

(22) Filed: Sep. 19, 2007

(65) Prior Publication Data

US 2009/0071442 A1    Mar. 19, 2009

(51) Int. Cl.
*F02C 9/00* (2006.01)
(52) U.S. Cl. .................. 60/39.281; 60/734; 417/16
(58) Field of Classification Search .............. 60/39.281, 60/734; 417/16, 44.1, 271, 410, 415, 420
See application file for complete search history.

(56) References Cited

U.S. PATENT DOCUMENTS

| | | | |
|---|---|---|---|
| 4,208,871 A * | 6/1980 | Riple, Jr. .................. | 60/39.281 |
| 4,608,820 A | 9/1986 | White et al. | |
| 5,744,896 A | 4/1998 | Kessinger, Jr. et al. | |
| 6,715,278 B2 | 4/2004 | Demers | |
| 6,971,373 B2 | 12/2005 | Mudway et al. | |
| 6,996,969 B2 | 2/2006 | Dalton | |
| 2003/0061799 A1 | 4/2003 | Demers | |
| 2005/0074339 A1* | 4/2005 | Asa et al. ..................... | 417/212 |
| 2005/0112001 A1* | 5/2005 | Bahnen et al. .............. | 417/418 |
| 2005/0244290 A1* | 11/2005 | Inagaki et al. ............... | 417/416 |
| 2007/0020107 A1* | 1/2007 | Sauciuc et al. ................ | 417/16 |
| 2008/0008609 A1* | 1/2008 | Pate et al. .................... | 417/415 |

* cited by examiner

*Primary Examiner*—Michael Cuff
*Assistant Examiner*—Phutthiwat Wongwian
(74) *Attorney, Agent, or Firm*—Ingrassia Fisher & Lorenz, P.C.

(57) ABSTRACT

A direct metering fuel supply system includes a plurality of axial gap motors, a fixed displacement, variable speed positive displacement piston pump, and a gas turbine engine control. Each axial gap motor is configured to be selectively energized and is operable, upon being energized, to supply a drive torque at a drive speed. The fixed displacement, variable speed positive displacement piston pump is coupled to each of the axial gap motors to receive the drive torque selectively supplied therefrom and is operable, upon receipt of the drive torque, to supply fuel at a flow rate dependent on the drive speed. The gas turbine engine control is adapted to receive fuel flow commands and is operable, in response to the fuel flow commands, to energize one of the plurality of axial gap motors.

20 Claims, 3 Drawing Sheets

DIRECT METERING FUEL SYSTEM WITH AN INTEGRAL REDUNDANT MOTOR PUMP

TECHNICAL FIELD

The present invention generally relates to fuel metering systems and, more particularly, to direct metering fuel systems with integral redundant pump motors.

BACKGROUND

Many gas turbine engine fuel supply systems include a fuel source, such as a fuel tank, and one or more pumps that draw fuel from the fuel source and deliver pressurized fuel to the fuel manifolds in the engine combustor via a main supply line. The main supply line may include one or more valves in flow series between the pumps and the fuel manifolds. These valves generally include, for example, a main metering valve and a pressurizing-and-shutoff valve downstream of the main metering valve. In addition to the main supply line, many fuel supply systems also include a bypass flow line connected upstream of the metering valve that bypasses a portion of the fuel flowing in the main supply line back to the inlet of the one or more pumps, via a bypass valve. The position of the bypass valve is typically controlled by a head regulation scheme to maintain a substantially fixed differential pressure across the main metering valve.

The above-described fuel supply system is generally safe, reliable, and robust. Nonetheless, it can suffer certain drawbacks. For example, the metering valve and bypass valve can add to overall system weight and complexity. Moreover, control of the metering valve and bypass valve can result in increased system complexity and cost. Thus, in recent years there has been a desire to implement more direct metering fuel control systems. In such systems fuel flow rate is controlled by controlling, for example, the speed or the displacement of the fuel metering pump. Yet, efforts to implement direct fuel metering control systems have also been impeded by certain drawbacks. For example, many gas turbine engines include one or more fluid-operated actuators. In many instances these actuators are driven by the fuel from the fuel supply system. Thus, actuator operation can cause a droop in the fuel supplied to the engine, and thus an undesirable engine speed droop. It is also postulated that such fuel supply variations to the engine could yield unpredictable, and potentially less controllable, engine transients. Moreover, many current direct metering fuel systems are not as thermally efficient and cost effective as desired, and some systems may not exhibit sufficient redundancy and/or reliability.

Hence, there is a need for a system and method of controlling fuel flow in a direct metering fuel control system and does not cause, or that at least substantially lessens, fuel supply variations to the engine and/or does not yield unpredictable and/or relatively less controllable engine transients and/or exhibits increase thermal efficiency and cost effectiveness, and/or exhibits sufficient redundancy and/or reliability. The present invention addresses one or more of these needs.

BRIEF SUMMARY

In one embodiment, and by way of example only, a direct metering fuel supply system includes a plurality of axial gap motors, a fixed displacement, variable speed positive displacement piston pump, and a gas turbine engine control. Each axial gap motor is configured to be selectively energized and is operable, upon being energized, to supply a drive torque at a drive speed. The fixed displacement, variable speed positive displacement piston pump is coupled to each of the axial gap motors to receive the drive torque selectively supplied therefrom and is operable, upon receipt of the drive torque, to supply fuel at a flow rate dependent on the drive speed. The gas turbine engine control is adapted to receive fuel flow commands and is operable, in response to the fuel flow commands, to energize one of the plurality of axial gap motors.

In another exemplary embodiment, a direct metering fuel supply system includes a pump housing, a plurality of axial gap motors, a fixed displacement, variable speed positive displacement piston pump, and a gas turbine engine control. Each axial gap motor is disposed within the pump housing and is configured to be selectively energized and is operable, upon being energized, to supply a drive torque at a drive speed. The fixed displacement, variable speed positive displacement piston pump is disposed within the pump housing, is coupled to each of the axial gap motors to receive the drive torque selectively supplied therefrom and is operable, upon receipt of the drive torque, to supply fuel at a flow rate dependent on the drive speed. The gas turbine engine control is adapted to receive fuel flow commands and is operable, in response to the fuel flow commands, to energize one of the plurality of axial gap motors. Each axial gap motor includes a pair of permanent magnet rotors and a stator. Each permanent magnet rotors is coupled to the fixed displacement, variable speed positive displacement piston pump and has a plurality of magnetic dipoles disposed thereon. The stator has a plurality of independent stator coils disposed thereon, and is disposed between, and spaced axially apart from, each of the rotors.

In yet another exemplary embodiment, a direct metering fuel supply system includes a plurality of axial gap motors, a fixed displacement, variable speed positive displacement piston pump, and a gas turbine engine control. Each axial gap motor is configured to be selectively energized and is operable, upon being energized, to supply a drive torque at a drive speed. The fixed displacement, variable speed positive displacement piston pump is coupled to each of the axial gap motors to receive the drive torque selectively supplied therefrom and is operable, upon receipt of the drive torque, to supply fuel at a flow rate dependent on the drive speed. The gas turbine engine control is adapted to receive fuel flow commands and is operable, in response to the fuel flow commands, to energize one of the plurality of axial gap motors, and is further operable to determine operability of the energized axial gap motor and, based on this determination, to selectively deenergize the energized axial gap motor and energize a deenergized axial gap motor. Each axial gap motor includes a pair of permanent magnet rotors and a stator. Each permanent magnet rotors is coupled to the fixed displacement, variable speed positive displacement piston pump and has a plurality of magnetic dipoles disposed thereon. The stator has a plurality of independent stator coils disposed thereon, and is disposed between, and spaced axially apart from, each of the rotors.

BRIEF DESCRIPTION OF THE DRAWINGS

The present invention will hereinafter be described in conjunction with the following drawing figures, wherein like numerals denote like elements.

DETAILED DESCRIPTION

The following detailed description of the invention is merely exemplary in nature and is not intended to limit the invention or the application and uses of the invention. Furthermore, there is no intention to be bound by any theory presented in the preceding background of the invention or the following detailed description of the invention. In this regard, although an embodiment of the invention is described as being implemented in an aircraft, it will be appreciated that the invention may be implemented in numerous and varied end-use environments where fuel flow to a gas turbine engine is controlled.

Figure 1:
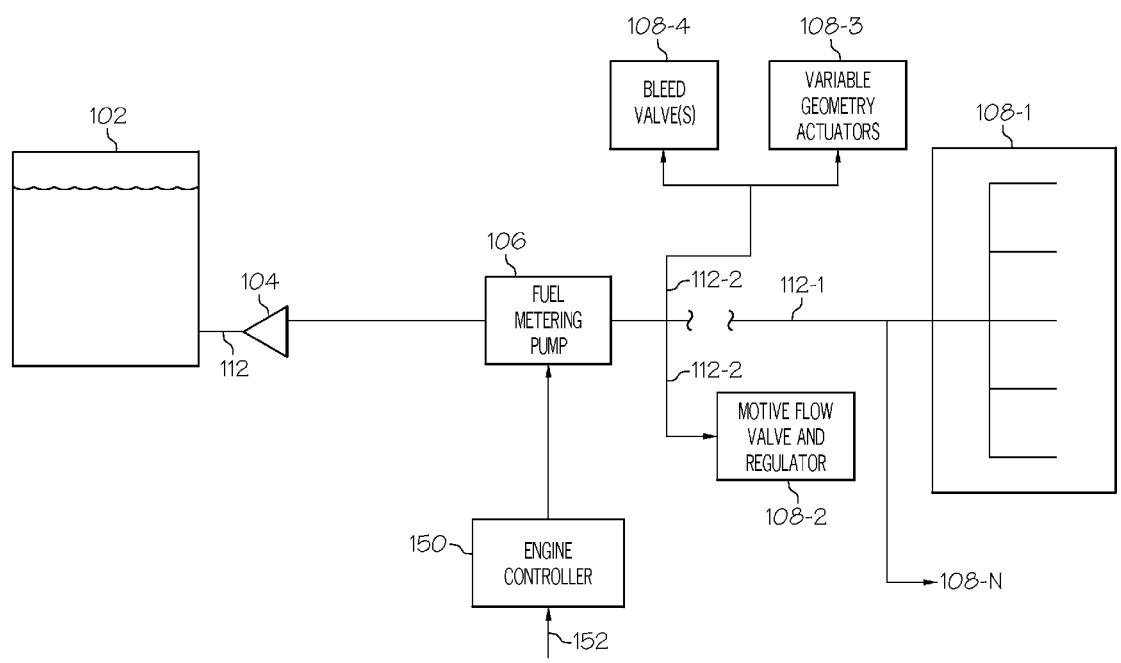
FIG. 1 is a simplified schematic diagram of an exemplary embodiment of a fuel delivery and control system for a gas turbine engine.

A simplified schematic diagram of one embodiment of a direct metering fuel control system for a gas turbine engine, such as a turbofan jet aircraft engine, is depicted in FIG. 1. The system 100 includes a fuel source 102, one or more pumps 104, 106, and an engine control 150. The fuel source 102, which is preferably implemented as one or more tanks, stores fuel that is to be supplied to a plurality of fuel loads 108 (e.g. 108-1, 108-2, 108-3, . . . 108-N). It will be appreciated that the number and type of fuel loads may vary, and may include one or more of a gas turbine engine combustor zone and associated nozzles 108-1, a motive flow valve and regulator 108-2, one or more variable geometry actuators 108-3, and one or more bleed valves 108-4, just to name a few. The fuel loads 108 are preferably classified as primary and secondary fuel loads based, for example, on functionality. Though the classifications may vary, the gas turbine engine combustor zone and associated nozzles 108-1 are typically classified as primary fuel loads, and the motive flow valve and regulator 108-2, the one or more variable geometry actuators 108-3, and the one or more bleed valves 108-4 are typically classified as secondary fuel loads.

A supply line 112 is coupled to the fuel source 102 and, via the fuel pumps 104, 106, delivers the fuel to the fuel loads 108. It is noted that the supply line 112 is, for convenience, depicted and described as a priority flow line 112-1 and a secondary flow line 112-2. The priority flow line 112-1 preferably delivers fuel to the primary fuel loads (e.g., 108-1), and the secondary flow line 112-2 preferably delivers fuel to the secondary fuel loads (e.g., 108-2, 108-3, 108-4, . . . 108-N). It will be appreciated that a pressurizing and shutoff valve, although not depicted or described herein, may be disposed in the supply line 112 downstream of the pumps 104, 106. The pressurizing-and-shutoff valve, if included, functions to ensure there is a minimum system pressure magnitude in portions of the supply line 112, and shuts when the pressure falls below this minimum pressure magnitude.

Each of the one or more pumps 104, 106 is positioned in flow-series in the supply line 112 and take a suction on the fuel source 102. In the depicted embodiment, a boost pump 104, such as a relatively low horsepower centrifugal pump, and a high pressure fuel metering pump 106 are used. The boost pump 104 draws fuel directly from the fuel source 102 and provides sufficient suction head for the fuel metering pump 106. The fuel metering pump 106 in turn supplies fuel at a relatively high pump discharge pressure to the remainder of the supply line 112. The boost pump 104 may be either mechanically driven by the engine, or electrically driven by a non-illustrated motor. Although not depicted, it will be appreciated that the system 100 may additionally include a low pressure pump within the fuel tank(s) 102 to supply fuel to the boost pump 104. Moreover, the boost pump 104 may, in some embodiments, not be included. A more detailed description of the fuel metering pump 106 is provided further below.

The engine control 150, which may be implemented within an engine controller, such as a Full Authority Digital Engine Controller (FADEC) or other electronic engine controller (EEC), controls the flow rate of fuel to the fuel loads 108. To do so, the engine control 150 receives various input signals and controls the operation of the fuel metering pump 108, and thus the fuel flow rate, accordingly. In the depicted embodiment, the engine control 150 receives an engine speed command signal 152, which is representative of a desired engine speed, from non-illustrated throttle control equipment in, for example, a non-illustrated cockpit. The engine control 150 is configured, in response to the engine speed command signal 152, to determine the fuel flow rate needed by the fuel loads 108. The engine control 150, based on this determination, appropriately energizes the fuel metering pump 106 to supply the combined fuel flow rate needed by fuel loads 108. Preferably, the engine control 150 is configured as a multi-channel device, in which one channel is operable and the remaining channels are in a standby mode. Although the number of channels may vary, in a particular preferred embodiment, the engine control 150 includes two independent channels.

Figure 2:
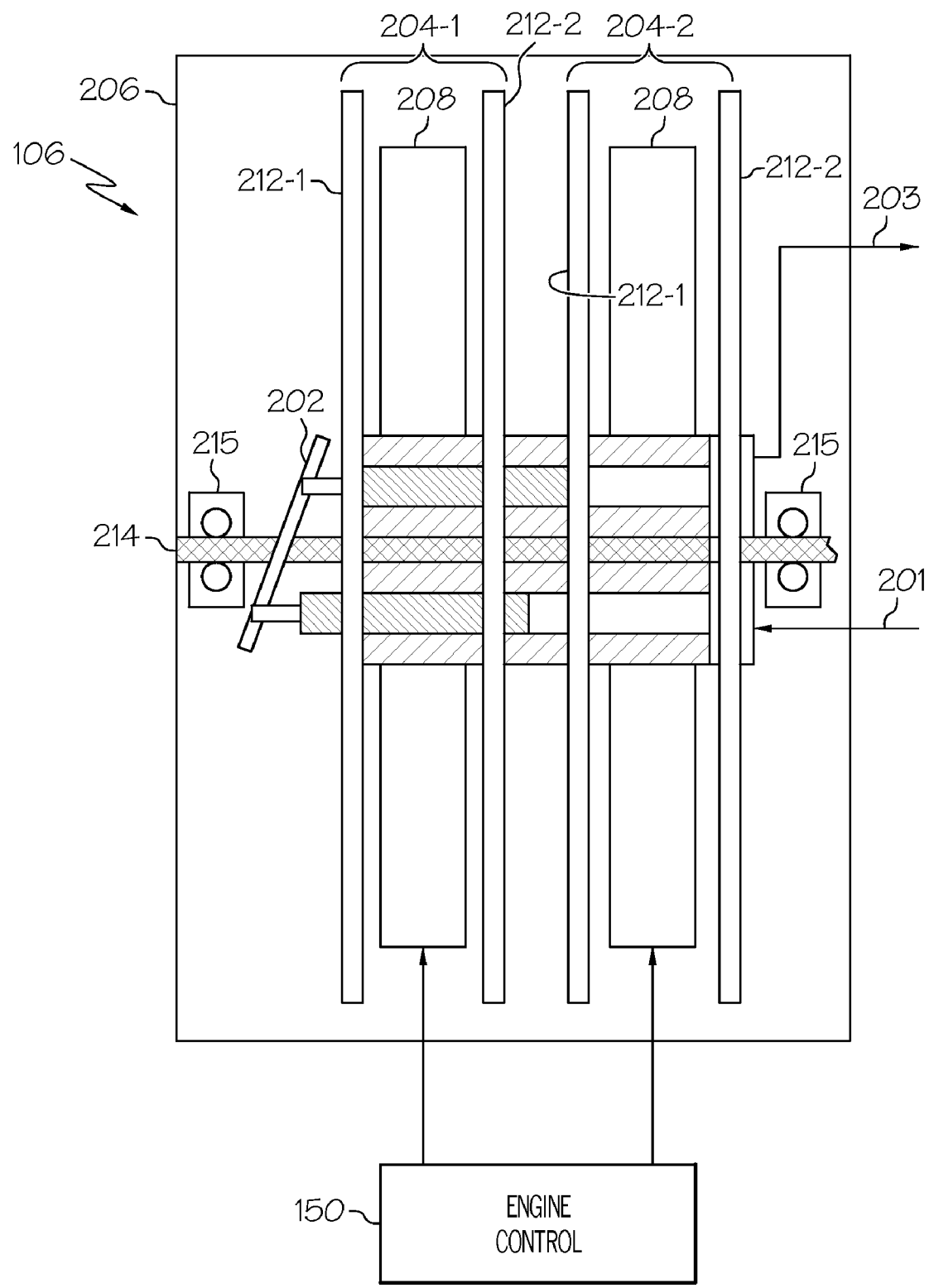
FIG. 2 is a schematic representation of an exemplary embodiment of a fuel metering pump that may be used to implement the system of FIG. 1, and that is coupled to an engine control.

Turning now to FIG. 2, an exemplary preferred embodiment of the fuel metering pump 106 is depicted, and will now be described. The fuel metering pump 106, as was just noted, is controllably energized by the engine control 150 to supply fuel at the appropriate fuel flow rate needed by the fuel loads 108. In the depicted embodiment, the fuel metering pump 106 includes a pump 202 and a plurality of motors 204 (e.g., 204-1, 204-2), preferably disposed within a single housing structure 206. The pump 202 is coupled to each of the motors 204 and, in response to a drive torque supplied thereto from one of the motors 204, draws fuel into a pump inlet 201 and supplies fuel to the fuel loads via a pump outlet 203. The pump 202 is preferably a fixed displacement, variable speed positive displacement piston pump, and includes a pump rotor (or shaft) 214 that is rotationally mounted within the housing via a plurality of bearing assemblies. As is generally known, a fixed displacement, variable speed positive displacement piston pump exhibits generally linear flow versus drive speed characteristics. Thus, the flow rate at which the pump 202 supplies fuel is controlled based on the drive speed of the motor 204 that is supplying the drive force.

The motors 204 are implemented as brushless DC axial gap motors (e.g., SEMA motors), and each motor 204 includes a stator 208 and a plurality of permanent magnet rotors 212 (e.g., 212-1, 212-2). The stator 208 is disposed between, and is spaced axially apart from, the permanent magnet rotors 212, which are mounted directly on the pump shaft 214 and thus share the bearing assemblies 215. It will be appreciated that the number of stators 208 and permanent magnet rotors 212 that are used to implement each motor 204 may vary. For example, in the embodiment depicted in FIG. 2, each motor 204 includes one stator 208 and an associated pair of permanent magnet rotors 212 (e.g., 212-1, 212-2). However, each motor 204 could be implemented with varying numbers of stators 208 and permanent magnet rotors 212.

In addition to variations in the number of stators 208 and permanent magnet rotors 212, the specific structure of the stators 208 and permanent magnet rotors 212 may also vary.

Figure 3:
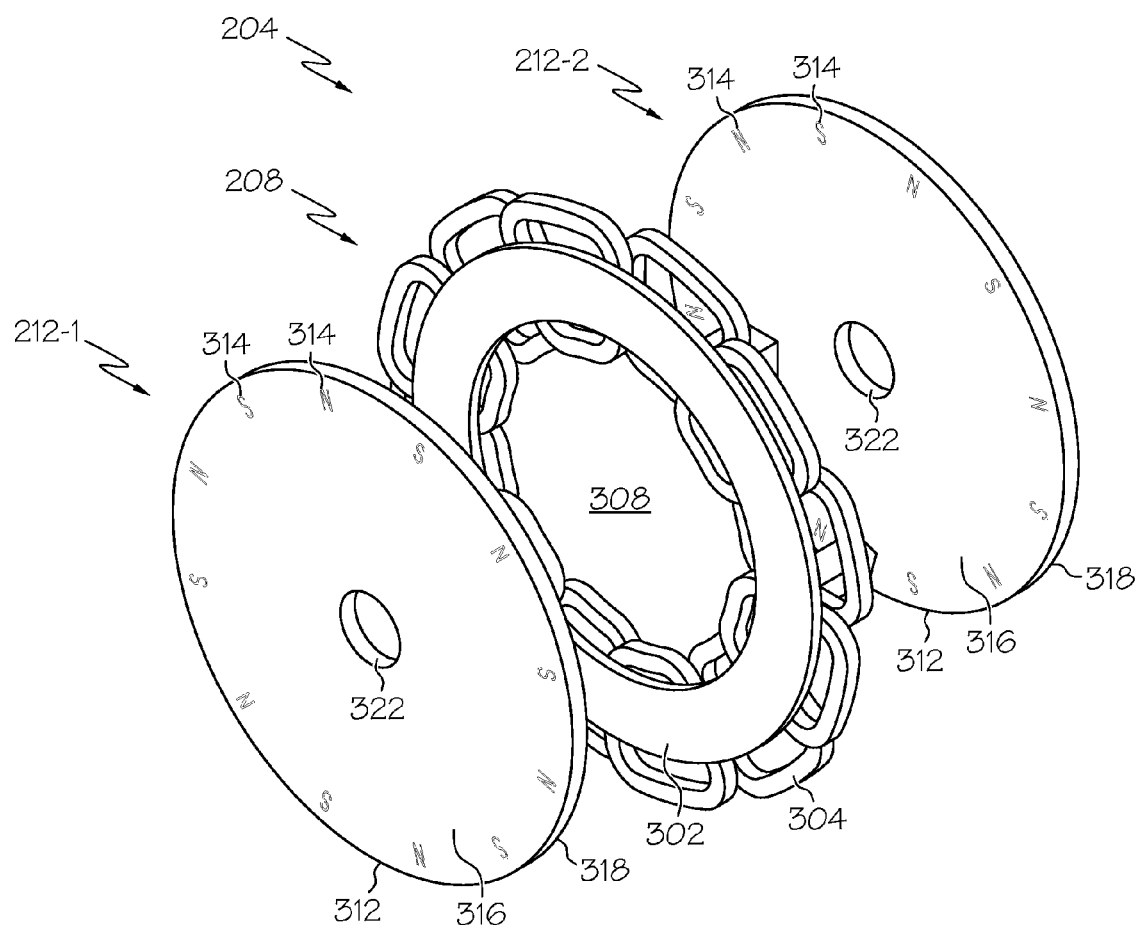
FIG. 3 is an exploded view of an exemplary physical implementation of axial gap motor that may be used to implement the fuel metering pump of FIG. 2.

In one particular embodiment, which is depicted in FIG. 3, each stator 208 includes a pair of coil support structures 302 (only one visible) and a plurality of stator coils 306. The coil support structures 302 may be variously configured, but in the depicted embodiment the coil support structures 302 are generally ring-shaped, having a central opening 308 through which the pump shaft 214 passes. The coil support structures 302, 304 may additionally be constructed of any one of numerous types of magnetically permeable materials.

The stator coils 306 are disposed between each pair of coil support structures 302. The stator coils 306 that make up each of the individual stators 208 are wound and electrically coupled together to form a three-phase stator 208. It will be appreciated that the stator coils 306 that make up each stator 208 may be electrically coupled in various configurations, including a wye configuration or a delta configuration. The particular configuration may vary depending, for example, on the number of rotor poles.

With continued reference to FIG. 3, it is seen that the permanent magnet rotors 212 each include a main body 312 and a plurality of magnetic dipoles 314. The main body 312 may be variously configured, but in the depicted embodiment the main body 312 is at least substantially disk-shaped, and has at least a first side 316, a second side 318, and a shaft mount opening 322. The permanent magnet rotors 212 are each mounted on the pump shaft 214 via the shaft mount openings 322. The main bodies 312, similar to the coil support structures 302, 304 may additionally be constructed of any one of numerous types of magnetically permeable materials.

The plurality of magnetic dipoles 314 are evenly spaced radially around each of the main bodies 312. The plurality of magnetic dipoles 314 on each main body 312 alternate radially around the main body 312 between a magnetic north pole (N) and a magnetic south pole (S). Moreover, the plurality of magnetic dipoles 314 on each of the main bodies 312 are axially aligned, and are arranged such that the axially aligned magnet dipoles 314 have like magnetic polarities facing the interposed stator 208, thereby ensuring that the torque generated on the two rotors 212 is not cancelled out. It will be appreciated that the number of magnetic dipoles 314 that are included on each rotor 212 may vary, depending on the number of poles to be implemented.

With the above-described configuration, the stator coils 306 on the stator 208 associated with a motor 204 may be selectively energized, using known brushless DC motor commutation techniques, to generate a rotating magnetic field. The rotors 212 that are adjacent the energized stator 208 will in turn rotate, and supply a rotational drive force, to the pump 202. As shown in FIG. 2, the engine control 150 is independently coupled to each stator 208 and implements, among other functions, appropriate brushless DC motor commutation. It will be appreciated that each motor 204 and the engine control 150 may be configured to implement either sensorless or position feedback motor commutation techniques. No matter the particular commutation technique that is employed, in a preferred embodiment, the engine control 150 is configured to energize the coils 306 on only one of the stators 208 at a time. As a result, the rotors 212 (e.g., 212-1, 212-2) adjacent the energized stator 208 will rotate and supply a rotational drive force to the pump 202. The speed of the energized motor 204, and the concomitant drive force supplied by the energized motor 204 to the pump 202, is controlled such that the pump 202 supplies fuel at the fuel flow rate determined by the engine control 150.

The engine control 150 is also preferably configured to determine the operability of the energized motor 204. If the engine control 150 determines that the energized motor 204 is inoperable or otherwise not operating properly, the engine control 150 will deenergize the energized motor 204-1 (204-2) and energize the previously deenergized motor 204-2 (204-1). It will be appreciated that the engine control 150 may determine the operability of the energized motor 204 using any one of numerous techniques. For example, the engine control may determine operability from measured fuel flow, motor or pump speed, motor current, or various combinations of these parameters, just to name a few.

The relatively high and linear torque output supplied by the axial gap motors 204, and the volumetric efficiency of the fixed displacement, variable speed positive displacement piston pump enables the engine control 150 to anticipate fuel demand by the secondary fuel loads 108-2, 108-3, 108-4, . . . 108-N so as to minimize the droop in fuel delivery to the primary fuel load 108-1. This unique combination of elements also exhibits increased thermal efficiency and cost effectiveness relative to known systems, and further exhibits sufficient redundancy and reliability.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A direct metering fuel supply system, comprising:
   a plurality of axial gap motors, each axial gap motor configured to be selectively energized and operable, upon being energized, to supply a drive torque at a drive speed;
   a fixed displacement, variable speed positive displacement piston pump coupled to each of the axial gap motors to receive the drive torque selectively supplied therefrom and operable, upon receipt of the drive torque, to supply fuel at a flow rate dependent on the drive speed; and
   a gas turbine engine control adapted to receive fuel flow commands and operable, in response to the fuel flow commands, to energize one of the plurality of axial gap motors,
   wherein each axial gap motor comprises a pair of permanent magnet rotors, each rotor coupled to the fixed displacement, variable speed positive displacement piston pump and having a plurality of magnetic dipoles disposed thereon.

2. The system of claim 1, wherein each axial gap motor further comprises: a stator having a plurality of independent stator coils disposed thereon, the stator disposed between, and spaced axially apart from, each of the rotors.

3. The system of claim 1, wherein the gas turbine engine control is further operable to determine operability of the energized axial gap motor and, based on this determination, to selectively deenergize the energized axial gap motor and energize a deenergized axial gap motor.

4. The system of claim 1, further comprising:
   a boost pump disposed upstream of, and in fluid communication with, the fixed displacement, variable speed positive displacement pump, the boost pump operable to supply fuel to the fixed displacement, variable speed positive displacement pump.

5. The system of claim 4, further comprising:
a fuel source disposed upstream of, and in fluid communication with, the boost pump.

6. The system of claim 1, wherein the gas turbine engine control comprises a plurality of independent channels, each channel selectively responsive to the fuel flow commands.

7. The system of claim 6, wherein only one independent channel is operable.

8. The system of claim 1, further comprising:
a pump housing having the plurality of axial gap motors and the fixed displacement, variable speed positive displacement piston pump disposed therein.

9. A direct metering fuel supply system, comprising:
a pump housing;
a plurality of axial gap motors disposed within the pump housing, each axial gap motor configured to be selectively energized and operable, upon being energized, to supply a drive torque at a drive speed;
a fixed displacement, variable speed positive displacement piston pump disposed within the pump housing, the fixed displacement, variable speed positive displacement piston pump and coupled to each of the axial gap motors to receive the drive torque selectively supplied therefrom and operable, upon receipt of the drive torque, to supply fuel at a flow rate dependent on the drive speed; and
a gas turbine engine control adapted to receive fuel flow commands and operable, in response to the fuel flow commands, to energize one of the plurality of axial gap motors,
wherein each axial gap motor comprises:
a pair of permanent magnet rotors, each rotor coupled to the fixed displacement, variable speed positive displacement piston pump and having a plurality of magnetic dipoles disposed thereon; and
a stator having a plurality of independent stator coils disposed thereon, the stator disposed between, and spaced axially apart from, each of the rotors.

10. The system of claim 9, wherein the gas turbine engine control is further operable to determine operability of the energized axial gap motor and, based on this determination, to selectively deenergize the energized axial gap motor and energize a deenergized axial gap motor.

11. The system of claim 9, further comprising:
a boost pump disposed upstream of, and in fluid communication with, the fixed displacement, variable speed positive displacement pump, the boost pump operable to supply fuel to the fixed displacement, variable speed positive displacement pump.

12. The system of claim 11, further comprising:
a fuel source disposed upstream of, and in fluid communication with, the boost pump.

13. The system of claim 9, wherein the gas turbine engine control comprises a plurality of independent channels, each channel selectively responsive to the fuel flow commands.

14. The system of claim 13, wherein only one independent channel is operable.

15. A direct metering fuel supply system, comprising:
a plurality of axial gap motors, each axial gap motor configured to be selectively energized and operable, upon being energized, to supply a drive torque at a drive speed;
a fixed displacement, variable speed positive displacement piston pump coupled to each of the axial gap motors to receive the drive torque selectively supplied therefrom and operable, upon receipt of the drive torque, to supply fuel at a flow rate dependent on the drive speed; and
a gas turbine engine control adapted to receive fuel flow commands and operable, in response to the fuel flow commands, to energize one of the plurality of axial gap motors, the gas turbine engine control is further operable to determine operability of the energized axial gap motor and, based on this determination, to selectively deenergize the energized axial gap motor and energize a deenergized axial gap motor,
wherein each axial gap motor comprises:
a pair of permanent magnet rotors, each rotor coupled to the fixed displacement, variable speed positive displacement piston pump and having a plurality of magnetic dipoles disposed thereon; and
a stator having a plurality of independent stator coils disposed thereon, the stator disposed between, and spaced axially apart from, each of the rotors.

16. The system of claim 15, further comprising:
a boost pump disposed upstream of, and in fluid communication with, the fixed displacement, variable speed positive displacement pump, the boost pump operable to supply fuel to the fixed displacement, variable speed positive displacement pump.

17. The system of claim 16, further comprising:
a fuel source disposed upstream of, and in fluid communication with, the boost pump.

18. The system of claim 15, wherein the gas turbine engine control comprises a plurality of independent channels, each channel selectively responsive to the fuel flow commands.

19. The system of claim 18, wherein only one independent channel is operable.

20. The system of claim 15, further comprising:
a pump housing having the plurality of axial gap motors and the fixed displacement, variable speed positive displacement piston pump disposed therein.

\* \* \* \* \*